US007068189B2

(12) United States Patent
Brescia

(10) Patent No.: US 7,068,189 B2
(45) Date of Patent: Jun. 27, 2006

(54) LOCATION AND EVENT TRIGGERED NOTIFICATION SERVICES

(75) Inventor: Paul T. Brescia, Morrisville, NC (US)

(73) Assignee: Nortel Networks Limited, St. Laurent (CA)

( * ) Notice: Subject to any disclaimer, the term of this patent is extended or adjusted under 35 U.S.C. 154(b) by 76 days.

(21) Appl. No.: 09/898,339

(22) Filed: Jul. 3, 2001

(65) Prior Publication Data

US 2003/0006912 A1    Jan. 9, 2003

(51) Int. Cl.
*G08G 1/123* (2006.01)

(52) U.S. Cl. ............... 340/995; 340/988; 340/990; 340/531

(58) Field of Classification Search ............. 340/995, 340/988, 905, 531, 539, 990; 701/213; 455/422, 445
See application file for complete search history.

(56) References Cited

U.S. PATENT DOCUMENTS

| 5,043,736 | A |  | 8/1991 | Darnell et al. ............. 342/357 |
| 5,579,535 | A |  | 11/1996 | Orlen et al. ............. 455/33.1 |
| 5,648,768 | A | * | 7/1997 | Bouve ..................... 340/988 |
| 5,774,803 | A |  | 6/1998 | Kariya ..................... 455/414 |
| 5,999,126 | A |  | 12/1999 | Ito ............................ 342/357.1 |
| 6,014,090 | A | * | 1/2000 | Rosen et al. ............... 340/905 |
| 6,091,956 | A |  | 7/2000 | Hollenberg ............... 455/456 |
| 6,097,313 | A |  | 8/2000 | Takahashi et al. ......... 340/905 |
| 6,138,072 | A |  | 10/2000 | Nagai ....................... 701/207 |
| 6,151,309 | A |  | 11/2000 | Busuioc et al. ........... 370/328 |
| 6,243,030 | B1 |  | 6/2001 | Levine ..................... 340/995 |
| 6,314,365 | B1 |  | 11/2001 | Smith ....................... 701/200 |
| 6,317,605 | B1 |  | 11/2001 | Sakuma .................... 455/457 |
| 6,349,203 | B1 | * | 2/2002 | Asaoka ..................... 340/995 |
| 6,353,398 | B1 | * | 3/2002 | Amin et al. ............... 340/995 |
| 6,381,465 | B1 |  | 4/2002 | Chern et al. .............. 455/466 |
| 6,452,498 | B1 |  | 9/2002 | Stewart .................... 340/573.1 |
| 6,560,456 | B1 |  | 5/2003 | Lohtia et al. ............. 455/445 |
| 6,587,759 | B1 |  | 7/2003 | Obradovich et al. ...... 701/1 |
| 6,741,188 | B1 |  | 5/2004 | Miller et al. ............. 340/995.1 |
| 6,785,551 | B1 |  | 8/2004 | Richard .................... 455/456.1 |

(Continued)

FOREIGN PATENT DOCUMENTS

DE          19735836 A1      2/1999

(Continued)

OTHER PUBLICATIONS

"Method for Generating Location-Specific Internet Application Content," Research Disclosure, Kenneth Mason Publication, Hampshire, GB, No. 425, p. 1197, XP000889180.

(Continued)

*Primary Examiner*—Hung Nguyen
(74) *Attorney, Agent, or Firm*—Withrow & Terranova, PLLC

(57) ABSTRACT

The present invention provides for delivering information, such as a notification or other content, to a select communication device when defined event and location criteria are satisfied. A profile is established to define the event and location criteria along with a method for delivering the information. Typically, the receipt of event indicia indicating the occurrence of an event is compared with the event criteria in the profile. When the event indicia satisfies the event criteria, location indicia is gathered and compared with the defined location criteria. Alternatively, a trigger corresponding to location is received and compared with the location criteria before determining whether an event corresponding to the event criteria is satisfied. When both the event occurrence and location indicia match the event and location criteria, the information is sent to the appropriate communication device.

23 Claims, 4 Drawing Sheets

U.S. PATENT DOCUMENTS 6,925,603 B1  8/2005  Naito et al. .................. 715/733

FOREIGN PATENT DOCUMENTS

| EP | 0874529 A2 | 10/1998 |
| --- | --- | --- |
| EP | 0896460 A2 | 2/1999 |
| EP | 1 130 933 A1 | 9/2001 |
| JP | 09-288684 | 11/1997 |
| JP | 2001-92878 | 4/2001 |
| WO | WO 97/41654 | 11/1997 |
| WO | WO 99/04582 | 1/1999 |
| WO | WO 00/22860 | 4/2000 |
| WO | WO 00/79811 A1 | 12/2000 |

OTHER PUBLICATIONS

Johnson et al., "Ericsson's WebOnAir Information Server," On—Ericcson Review, Ericsson, Stockholm, SE, vol. 77, No. 4, pp. 264-274, XP000969934.

Mihovska, Albena, and Pereira, Jorge M., "Location-Based VAS: Killer Applications for the Next-Generation Mobile Internet," 12th IEEE International Symposium on Personal, Indoor and Mobile Radio Communications, PIMRC 2001 Proceedings (Cat. No. 01TG8598), Piscataway, NJ, pp. B-50-54, vol. 1, XP002216917.

European Search Report issued Nov. 12, 2003 for European patent application 02252432.6.

* cited by examiner

LOCATION AND EVENT TRIGGERED NOTIFICATION SERVICES

FIELD OF THE INVENTION

The present invention relates to providing information, and in particular to providing information in light of select location and event criteria.

BACKGROUND OF THE INVENTION

The expansion of Internet service, in particular relating to mobile devices, has led to services capable of providing information on a periodic basis or upon the occurrence of an event. For example, a message may be sent to a web-enabled device when a stock price reaches a select value, or periodically to provide an update for a particular sporting event. Unfortunately, these services typically require very specific definitions for the notifications or content requested. The result is an unfriendly service requiring very specific configuration. Further, much of the time the requested information is sent in an untimely manner based on the requestor's location.

For example, weather updates and alerts for a user's hometown may be unnecessary when the user is on vacation or out of town on business. Similarly, stock quotes and sports scores may not be welcome on a user's mobile telephone while the user is at work, but are preferable only when the user is driving home or having lunch. Existing services fail to define notification and content services based on a user's location and the occurrence of an event. Therefore, there is a need for a way to provide information to a requester based on the requestor's location and the occurrence of an event triggering the potential need to deliver the information.

SUMMARY OF THE INVENTION

The present invention provides for delivering information, such as a notification or other content, to a select communication device when defined event and location criteria are satisfied. A profile is established to define the event and location criteria along with a method for delivering the information. Typically, the receipt of event indicia indicating the occurrence of an event is compared with the event criteria in the profile. When the event indicia satisfies the event criteria, location indicia is gathered and compared with the defined location criteria. Alternatively, a trigger corresponding to location is received and compared with the location criteria before determining whether an event corresponding to the event criteria is satisfied. When both the event occurrence and location indicia match the event and location criteria, the information is sent to the appropriate communication device.

Location indicia may be derived from any number of sources, including global positioning system (GPS) devices, an electronic mobile location center (EMLC), home or visitor location registers within a mobile network, or mobile terminals themselves. Depending on the desired application, the location of a mobile terminal, user, associate of a user, or any other entity or individual may be used to help trigger the provision of a notification or content delivery to a select communication device. Thus, the location information may pertain to the user, a user's device, or another individual device remote from the user. In essence, a location process is used to identify the location of a defined entity. The location may be determined on a periodic basis or upon the triggering of an event that may or may not be associated with the location of the entity. An event occurrence may be time based, location based, user initiated, or initiated by an external medium, such as a mobile terminal, communication control devices within the communication network, or an event service.

A content service may be used to provide content when select event and location indicia correlate with event and location criteria defined by a profile. The content may include any type of information desired by a user and defined in the profile. Notably, certain applications according to the present invention may only provide notifications defined in a profile or provided with an event trigger, and therefore, would not need the services of a remote content service.

Based on select criteria, the present invention is capable of delivering information, such as notifications and content, to any number of devices, which are typically serviced by a circuit-switched network. These devices may include, but are not limited to, traditional land line telephones, computers, mobile terminals, such as personal digital assistants (PDAs), mobile telephones, pagers, and the like. In addition to devices serviced by circuit-switched networks, wireless packet-switched devices, such as properly configured mobile telephones, may communicate with a traditional packet-switched network via wireless packet-switched networks. In the latter case, information is communicated between the wireless packet-switched device and devices on the packet-switched network without conversion to a circuit-switched format, such as the traditional time-division multiplexing (TDM).

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
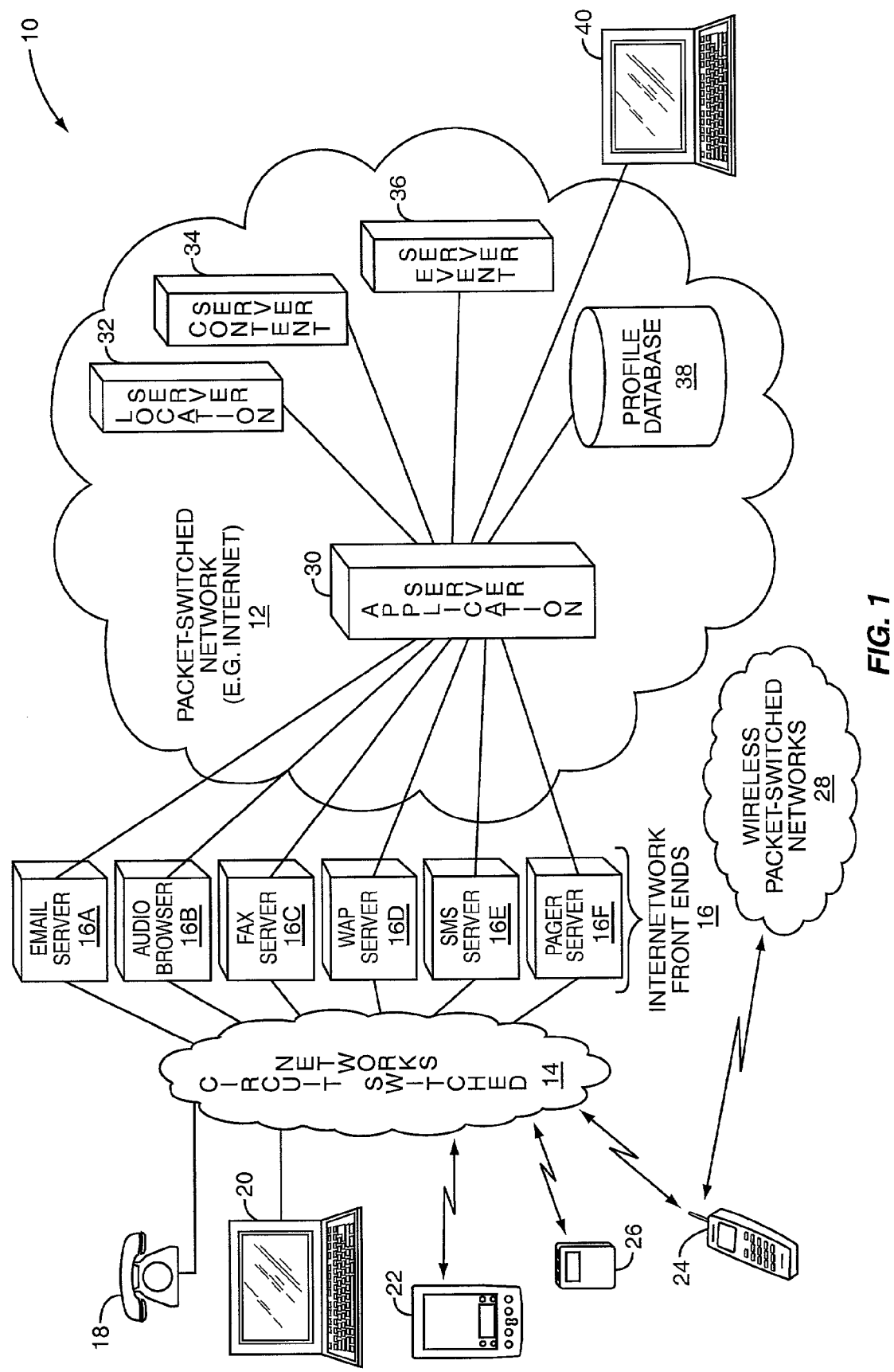
FIG. 1 is an illustration representing a communication environment according to one embodiment of the present invention.

A communication environment 10 is illustrated in FIG. 1 to include a packet-switched network 12, such as the Internet, and circuit-switched networks 14, cooperating with one another via various internetwork front ends 16 to facilitate communications between the networks and various devices connected thereto. Those skilled in the art will recognize that the packet-switched network 12 may include numerous networks connected to each other via hubs, routers, and switches to facilitate packet-switched communications. Further, the circuit-switched networks 14 will typically include the Public Switched Telephone Network (PSTN) and a wireless circuit-switched network to facilitate traditional mobile communications.

The internetwork front ends 16 represent various devices capable of facilitating communications, and in particular, providing information, such as content for notifications, to circuit-switched devices served by the circuit-switched networks 14. The internetwork front ends 16 may include, but are not limited to, email servers 16A, audio browsers 16B, fax servers 16C, wireless application protocol (WAP) servers 16D, short message service (SMS) servers 16E, and pager servers 16F. Each of these devices is configured to receive a message or other instructions from a packet-switched device on the packet-switched network 12 and deliver a message capable of being received and processed, directly or through intermediate devices, to circuit-switched devices on the circuit-switched networks 14.

The email server 16A is capable of sending email to devices receiving email via the circuit-switched networks 14. Similarly, the fax, WAP, SMS, and pager servers 16C–16F are capable of sending faxes, WAP messages, SMS messages, and pages to corresponding devices served by the circuit-switched networks 14. As will be described in further detail below, the audio browser 16B is configured to provide an audio interface via the circuit-switched network 14 and a corresponding packet-switched interface to devices in the packet-switched network 12.

Based on select criteria, the present invention is capable of delivering information, such as notifications and content, to any number of devices, which are typically serviced by a circuit-switched network 14. These devices may include, but are not limited to, traditional land line telephones 18, computers 20, mobile terminals, such as personal digital assistants (PDAs) 22, mobile telephones 24, pagers 26, and the like. In addition to devices serviced by circuit-switched networks 14, wireless packet-switched devices, such as properly configured mobile telephones 24, may communicate with a traditional packet-switched network 12 via wireless packet-switched networks 28. In the latter case, information is communicated between the wireless packet-switched device and devices on the packet-switched network 12 without conversion to a circuit-switched format, such as the traditional time-division multiplexing (TDM).

In one embodiment of the present invention, an application server 30 residing in the packet-switched network 12 runs a process capable of determining if event and location information correspond to a predefined profile, which defines a notification or content to provide to a user via a select medium when the event and location information correlate. The application server 30 may access location information from a variety of sources, including a location server 32, which may run a process capable of receiving or determining location information in a variety of ways.

Although the location process may run on the application server 30, a separate service provider may be used to provide a location service. Location information may be derived from any number of sources, including global positioning system (GPS) devices, an electronic mobile location center (EMLC), home or visitor location registers within a mobile network, or mobile terminals themselves. Depending on the desired application, the location of a mobile terminal, user, associate of a user, or any other entity or individual may be used to help trigger the provision of a notification or content to a select communication device.

Thus, the location information may pertain to the user, a user's device, or another individual device remote from the user. In essence, a location process is used to identify the location of a defined entity. The location may be determined on a periodic basis or upon the triggering of an event that may or may not be associated with the location of the entity. Those skilled in the art will recognize the numerous location determining techniques capable of being used with the present invention.

A content server 34 and an event server 36 may be used to provide content when select event and location indicia correlate with event and location criteria defined by a profile. The content may include any type of information desired by a user. Notably, certain applications according to the present invention may only provide notifications defined in a profile or provided with an event trigger, and therefore, would not need the services of the content server 34. Further, the application server 30 may be configured to provide content in addition to or in lieu of that provided by the content server 34.

An event occurrence may be time based, location based, user initiated, or initiated by an external medium, such as a mobile terminal, communication control devices within the communication network, or an event service. In one embodiment, the event service is provided by a process running on the event server 36.

As noted, a customized profile may be configured via the application server 30 and stored in a profile database 38 that is integrated with or separate from the application server 30. A user may log in to the application server 30 through any number of devices, including personal computer 40, to create a profile. Each profile will typically define information to provide to a select device when predefined event and location indicia are satisfied. The information provided to the user may be a simple notification, pre-selected content, or a combination thereof.

A simple profile may provide predefined information when a select event occurs when an entity or person is identified to be at a select location, in a given area, or within a certain proximity of a given location. A more sophisticated profile may identify location and access content to deliver to a pre-defined user device. In addition to information to provide to a user specifying event criteria and location criteria, the profile will define a delivery medium for delivering the information to a select user device. The information may be provided in any number of ways, including an email, telephone call, fax, a WAP push, an SMS message, a page, or any other suitable communication medium through which the application server 30 can effect delivery of a message. Another alternative would be a simple packet-switched message to a device capable of interacting with a wireless packet-switched network 28. As such, virtually any message delivery medium is applicable.

Figure 2:
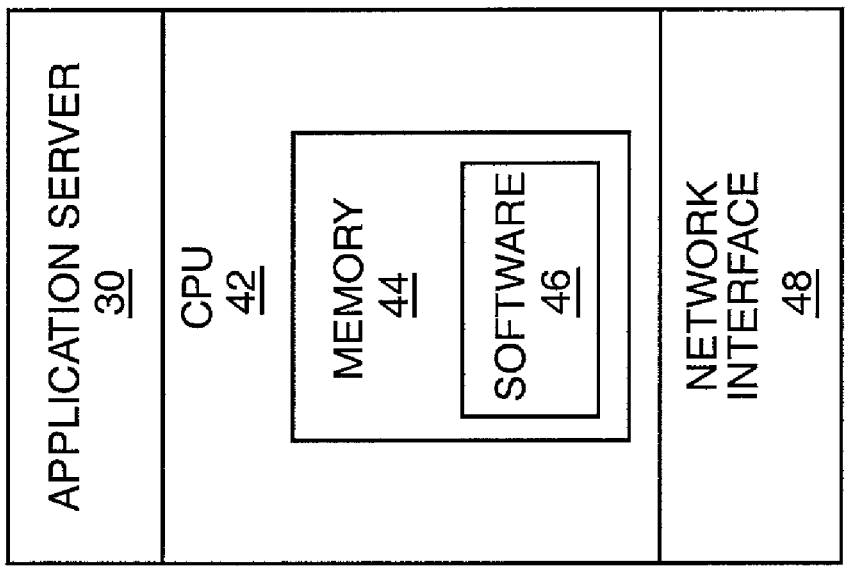
FIG. 2 is a block representation of an application server according to one embodiment of the present invention.

Many of these delivery mediums will simply incorporate a server or server process capable of interacting with the corresponding gateway or like device capable of translating the packet-switched message into a message capable of being transmitted over a circuit-switched network and on to a user device through the PSTN or wireless network in a text-based format. These servers, like the application server 30 illustrated in FIG. 2, will typically include a central processing unit (CPU) 42 having sufficient memory 44 containing the requisite software 46 for operation. The CPU 42 is associated with a network interface 48 to facilitate packet-switched communications with the various devices within and connected to the packet-switched network 12.

Figure 3:
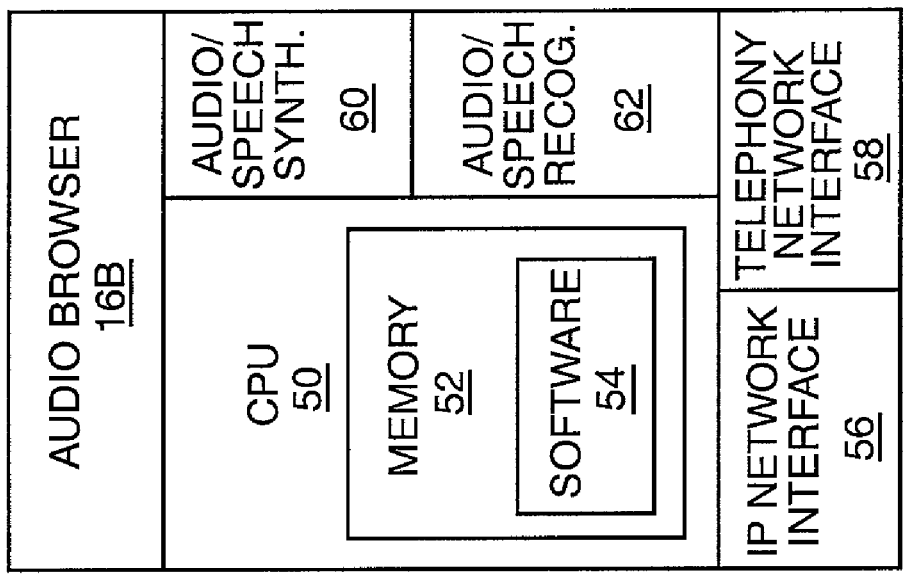
FIG. 3 is a block representation of an audio browser configured according to one embodiment of the present invention.

Audible messages may be sent over circuit-switched networks 14 using the audio browser 16B, which is illustrated in FIG. 3. In general, the application server 30 and audio browser 16B preferably operate in a client-server configuration using an audio- or voice-capable markup language. The audio browser 16B will interpret the markup language content representing the audio message to send to a telephony user and deliver the corresponding audio to the telephony user. If applicable, audio from the telephony user is likewise converted to content for delivery to the application server 30. The messages sent to the telephony user from the audio browser 16B may be pre-recorded, may be generated in real-time based on text-to-speech conversion, or may be a combination thereof.

The voice extensible markup language (VoiceXML) is the preferred markup language for interaction between the audio browser 16B and the application server 30. VoiceXML is an XML document schema developed by the VoiceXML Forum, a group of organizations founded by AT&T, IBM, Lucent Technologies, and Motorola. VoiceXML facilitate web-generated interactions through audio, either pre-recorded or translated from text to speech, and through voice, using speech recognition. Additional information on VoiceXML may be obtained from Motorola, Inc., 1303 East Algonquin Road, Schaumburg, Ill., 60196, or from the VoiceXML Forum, which has a web site at http://www.voicexml.org.

The audio browser 16B, which may be referred to as a voice browser, is analogous to traditional, graphical browsers using HTML. The W3C working draft for "An Introduction and Glossary for the Requirement Draft Voice Browsers," 23 Dec. 1999, provides additional information on voice browsers, and is incorporated herein by reference in its entirety.

As such, the audio browser 16B is the liaison between the circuit-switched networks 14 and the application server 30 of the packet-switched network 12, and operates according to a call dialog established by the markup language. The call dialog is preferably provided to the audio browser 16B in a VoiceXML web page created by the application server 30. The call dialog will preferably include the necessary information to interact with the telephony user, and optionally, establish calls to and originated by the telephony user, as well as report the status of the call or the caller's response.

Preferably, the application server 30 will generate the necessary call dialog in a VoiceXML page and provide the page to the audio browser 16B. The audio browser 16B will execute the call dialog to control communications with the telephony user via a user device, such as a mobile terminal, as well as deliver audio to the mobile terminal corresponding to the information and/or content to deliver to the user. Preferably, the call dialog provided in the form of a VoiceXML page to the audio browser 16B provides the audio browser 16B with sufficient instructions to carry out its translational duties and control communications with the user's device to facilitate information delivery as described herein.

Thus, the audio browser 16B provides text converted from audio to the application server 30 in the form of requests for web pages, and the responding web pages may include the text to convert and send to the user's device in an audible format. The VoiceXML pages will also include sufficient instructions to have the audio browser 16B convert incoming audio and request subsequent pages to facilitate ongoing communications as desired. The call dialog provided in the VoiceXML pages may facilitate numerous iterations, instructions, and commands to effectively control the audio browser 16B and the connection with the user's device.

An audio browser 16B, which will typically include a CPU 50 associated with memory 52 and the requisite software 54 to control operation. The CPU 50 is also associated with an IP network interface 56 for communicating with network devices, such as the application server 30. A telephony network interface 58 is provided for interaction with the circuit-switched networks 14, and in particular, a local exchange or mobile switching center, to facilitate circuit-switched communications. The telephony network interface 58 preferably supports a primary rate interface (PRI), T1, or like interface, to allow the audio browser 16B to directly communicate with telephony devices, such as a mobile terminal, via direct or wireless switching systems.

In order to recognize and inject audio, such as tones and speech, the audio browser 16B is preferably configured with an audio or speech synthesizer 60 and audio or speech recognition software/hardware 62. The speech synthesizer 60 is used to generate audio instructions and messages for the user. Notably, the audio browser 16B may use pre-recorded audio to provide messages to the called party based on instructions from the application server 30, or may convert textual content to speech. The speech recognition software/hardware 62 is configured to recognize speech of the user during a communication session, or to recognize tones, such as those generated from key presses of a telephony device, such as a mobile terminal. As noted above, the audio browser 16B preferably uses VoiceXML as a liaison between audio or speech, both spoken and recognized, and the data representing the speech that is sent to and from the application server 30. The audio browser 16B may include server processes in addition to the normal client processes of a traditional browser to facilitate communications with the user.

In operation, the server process on application server 30 monitors event triggers and location indicia in light of criteria in existing profiles. Typically, event occurrences are identified by the application server 30 receiving event triggers corresponding to the event occurrence. Upon receiving an event trigger, profiles with a corresponding event are identified. The identified profiles will define a location indicia, which is required in addition to the event indicia, to provide a select notification or content to a user.

As such, the server process will determine location indicia for the defined entity directly or through the location server 32. If the determined location indicia matches that of the profile, or is within a predefined range defined by the profile, appropriate information is sent to the defined device via an appropriate internetwork front end 16 or via the wireless packet-switched networks 28. If additional content is necessary other than that provided in the profile or with an event trigger, the content server 34 may be accessed to gather additional information to provide to the user via the defined medium. Alternatively, the application process may monitor location indicia, and when the location indicia matches that within the profile, check for an occurrence of the predefined event. The notification process would then follow.

Figure 4:
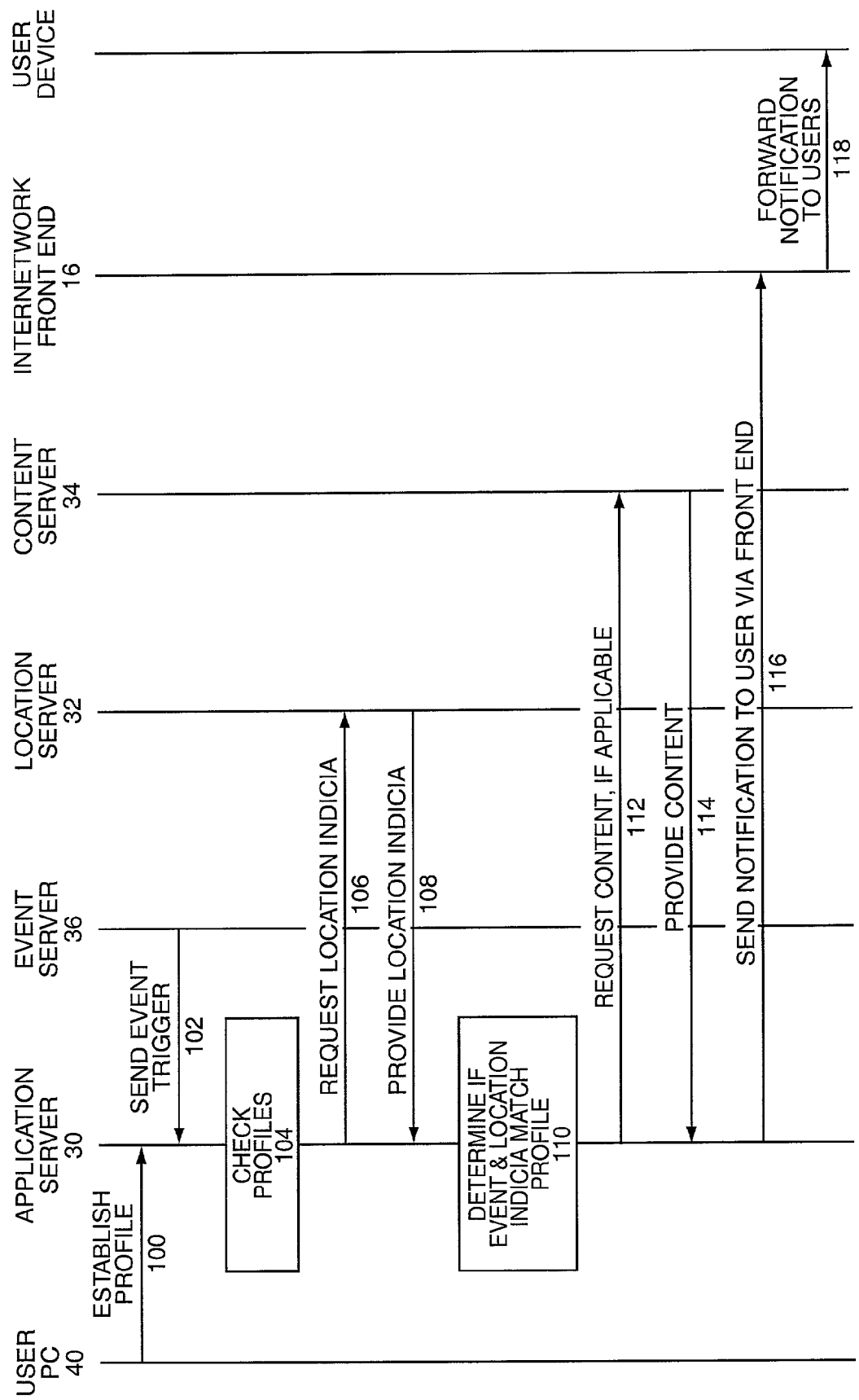
FIG. 4 is a communication flow diagram for a first illustrative example of the operation of the present invention.
Figure 5:
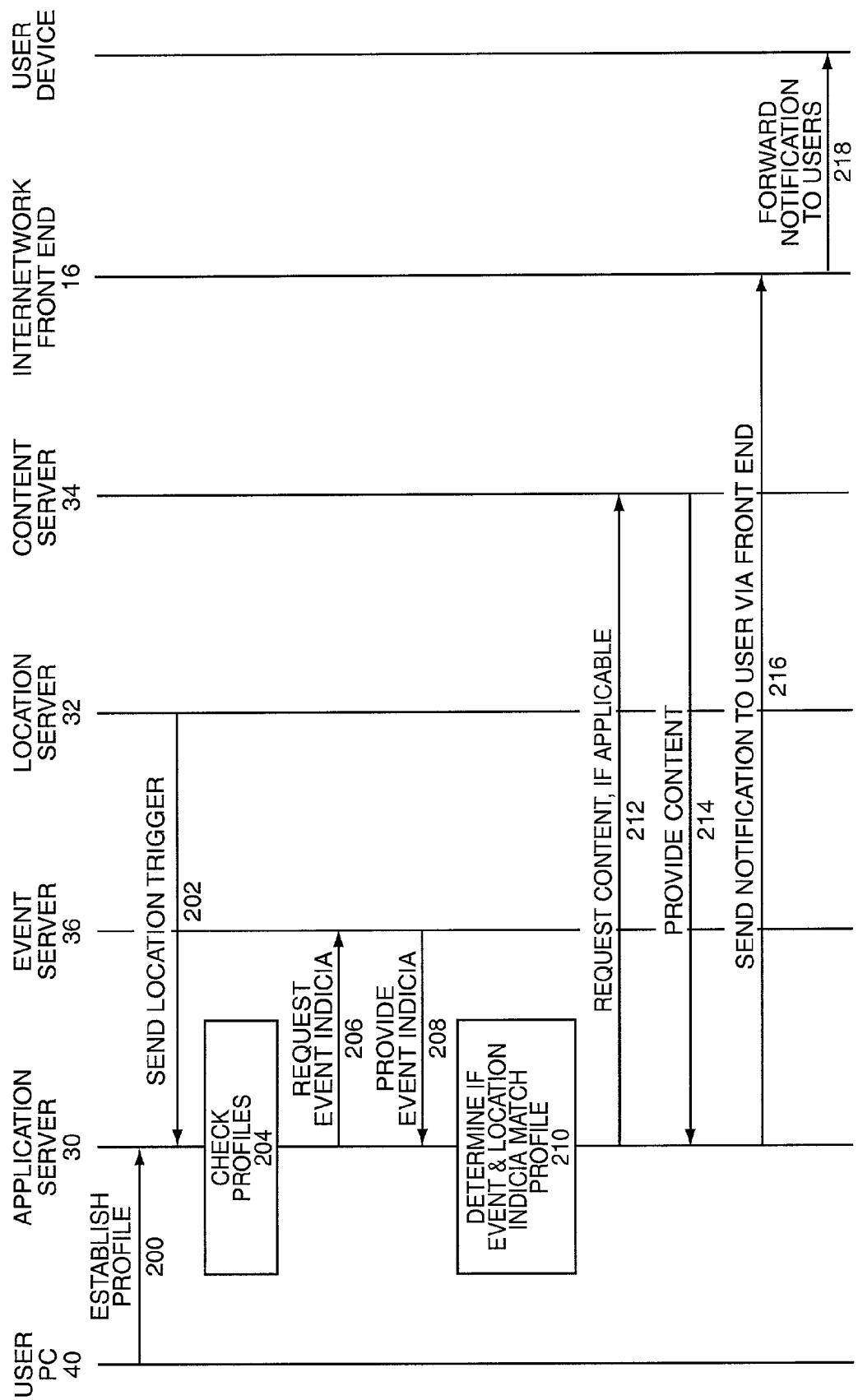
FIG. 5 is a communication flow diagram for a second illustrative example of the operation of the present invention.

FIGS. 4 and 5 provide detailed call flows for the above-described scenarios in a generic manner. After the description of each call flow, exemplary applications are provided. The first call flow embodiment illustrated in FIG. 4 begins with a user establishing a profile via the application server 30 using personal computer 40 (step 100). As discussed, the profile may be stored in a profile database 38 and will define an event and location criteria, which must be satisfied before notification of the event, and additional content, if desired, are provided to the user. As such, the application server 30 will preferably run an application process, which waits for the receipt of an event trigger. The event trigger may originate from the event server 36, other processes running on the application server 30, or virtually any remote device, including devices associated with the user. In the latter case, a user may initiate the trigger.

At some point, the defined event will occur and provide a trigger to the application process running on the application server 30 (step 102). The application process will check existing profiles to determine if the event or event type is defined by one of the user profiles (step 104). If the event trigger does not correspond to any events established in any of the profiles, the event trigger may be ignored. If the event trigger does correspond to events defined in one or more profiles, the application process will request location indicia defined by the respective profiles from the location server 32 or other device, including the user device, to identify location indicia (step 106). In response to the request, the location server 32 or other device, as applicable, will provide a location indicia back to the application process (step 108), which will determine if the event and location indicia match or otherwise correlate with the respective profiles (step 110).

If the event and location indicia do not correlate, then the event may be ignored and the application process will resume monitoring for receipt of subsequent event triggers. If the event and location indicia both correlate with the profile criteria, the user is notified via a defined user device in a manner defined in the profile. As noted, the profile may include a predefined notification and/or identify the location of specific content or a type of content to deliver to the user with or as a notification of the event occurrence and the fulfillment of the location criteria. As such, the application process may request content from the content server 34 or like content provider (step 112), which will respond by providing the requested content to the application processes running on the application server 30 (step 114).

The application process will then send the defined notification to the user via the appropriate internetwork front end 16 (step 116), which will forward the notification to the appropriate user device (step 118). In wireless packet-switched networks 28, the message may be sent directly to the appropriate wireless, packet-switched user device. Further, the profile may be configured to provide multiple notifications to multiple user devices, as well as devices not associated with the particular user. For example, select events may result in the notification of multiple family members through various types of devices.

An exemplary application for the illustrated call flow is to provide notification of weather conditions of interest occurring at predefined locations. Notably, these predefined locations may be fixed or relative to a moving user. For example, the location indicia defined in the profile may define the user's home, town, zip code, or the like, which remains fixed regardless of the user's actual position. Alternatively, the profile may define the location of any trackable device, such as a mobile terminal, wherein the user may request weather alerts related to the user's actual position. Further, the location indicia may be defined as an actual location, area, or proximity to a given location or area.

For example, assume a user establishes two profiles. The first profile is arranged to send notifications of severe weather affecting her child's school. Accordingly, the location indicia must correspond to the location of the child's school, and the event server may be a weather service cooperating with the application server 30 to provide severe weather alerts. Upon the occurrence of severe weather for any given location, the event server 36 will provide a severe weather alert to the application process running on the application server 30. The application process will identify the profile related to severe weather and identify the location indicia. In this case, the correlation between the location of the severe weather and the location indicia in the profile are compared. If the severe weather corresponds with the location of the school, a notification is sent to the user. The user may have the notification sent via email and via a mobile phone, using an SMS message or an actual telephone call providing an audible message.

A second severe weather profile may be configured to notify the user of severe weather occurring at the user's location. As such, the profile would again define severe weather alerts as well as the user's actual position. Since the user's position will constantly change, location information may be continuously or periodically gathered through any number of network devices, preferably corresponding to the position of the mobile terminals or other positioning system associated with the user. The location information may be obtained or gathered via a location process running on the location server 32, or alternatively, on the application server 30. Upon the occurrence of severe weather, the application server 30 will receive an alert from the event server 36 and identify the user's location. If the locations of the severe weather and the user correlate, a notification is sent to the user via one or more defined devices. Notably, the event trigger indicating the severe weather may include the location of the severe weather. These alerts may also identify the user or the user's profile to facilitate profile processing. Those skilled in the art will recognize various techniques for establishing event triggers corresponding to the occurrence of events as well as the monitoring or determination of location indicia.

A second illustrative example includes establishing a profile to receive news, stock quotes, or the like while outside a given location or within a select area. For example, a person may desire to receive audible news alerts during his commute to and from work via a mobile telephone 24. Further, the person does not want to receive news alerts outside of a given time frame or during work, even if he has to work late. Thus, the profile may be established to define event criteria as a time frame between 7 A.M. and 8 A.M., and between 5 P.M. and 7 P.M. The location criteria may be defined to exclude the person's work location or may define an area covering an area outside of the place or work, covering a substantial portion of the commute.

Accordingly, a timer process may be run on the application server 30 or the event server 36 to provide event triggers corresponding to the periods in which the person desires to receive the information. When the event triggers for the time periods occur, the application process will determine the person's location, and provide the requested content to the selected user device, such as the mobile telephone 24, only when the application process determines that the user is not at work, or is commuting.

The application process running on the application server 30 may monitor location triggers, and if they satisfy a particular profile, determine if event indicia corresponding to an event occurrence is satisfied. An example communication flow is illustrated in FIG. 5. Initially, a profile is established at the application server 30 using personal computer 40 (step 200). The application process running on the application server 30 may await a location server 32 or other device, including the user's mobile terminal, to initiate a location trigger, which is sent to the application process (step 202).

The application process will check existing profiles identifying the particular location associated with the location trigger (step 204), and request event indicia from an event server 36 or other appropriate process to determine if an event has occurred that corresponds to the location indicia in the respective profiles (step 206). The event server 36 will respond with event indicia indicating whether or not an event has occurred (step 208), and the application process will determine if the event and location indicia match the profile (step 210).

At this point, the application server 30 will request any content, if applicable, from a content server 34 or like content provider (step 212), which will provide the requested content to the application process (step 214). The application process will then send a notification to the user as defined in the profile (steps 216 and 218). The communication flow outlined in FIG. 5 may be implemented to facilitate the examples above wherein a location trigger is used to check a defined event instead of an event trigger being used to check a location.

In yet another embodiment, the event trigger may relate to location, proximity or positioning, wherein an event may be entering or leaving a defined location matching location indicia provided in the profile. For example, a traveler may create a profile identifying a type of content to provide to a user. For example, a profile may be configured to monitor when the mobile terminal enters a defined area and provide restaurant and hotel information for the particular area. The area may be defined geographically or may be based on available businesses, such as hotels and restaurants, or landmarks, such as monuments. In these cases, the event corresponds to entry into a particular location or within certain proximity of a defined area or point of interest, and the location information will closely couple with the event information. Thus, this example provides a unique combination wherein the location information and the event trigger are tightly coupled. Typically, the event is entry into a particular area or proximity to a certain location, and the location indicia defines a select location. Thus, the application process may receive a trigger that the mobile terminal has entered a certain area and compare the entered area with the location indicia defined in the user profile. Appropriate notification or content may then be provided to the user.

Those skilled in the art will recognize improvements and modifications to the preferred embodiments of the present invention. All such improvements and modifications are considered within the scope of the concepts disclosed herein and the claims that follow.

What is claimed is:

1. A method for notification comprising:
    a) determining an event occurrence;
    b) determining location indicia; and
    c) sending information to a plurality of communication devices when the event occurrence and the location indicia correlate with an event criteria and location criteria defined in a user-desired profile.

2. The method of claim 1 wherein the determining an event occurrence step comprises:
    a) waiting for an event trigger signaling the event occurrence;
    b) identifying the user-desired profile defining the event criteria corresponding to the event occurrence; and
    c) triggering the determining the location indicia step upon identifying the user-desired profile wherein the event occurrence corresponds with the event criteria.

3. The method of claim 1 wherein the determining location indicia step comprises:
    a) waiting for a location trigger with the location indicia;
    b) identifying the user-desired profile defining the location criteria corresponding to the location indicia; and
    c) triggering the determining the event occurrence step upon identifying the user-desired profile wherein the location indicia corresponds with the location criteria.

4. The method of claim 1 wherein the information sent to the purality of communication devices is a notification pertaining to the event occurrence and the location indicia.

5. The method of claim 1 wherein the information sent to the purality of communication devices is content pertaining to the event occurrence or the location indicia.

6. The method of claim 5 further comprising requesting the content from a remote service and receiving the content from the remote service.

7. The method of claim 1 wherein the location indicia is at least one of the group consisting of an actual location, area, and proximity to a location.

8. The method of claim 1 wherein the event occurrence is a weather event and the location indicia relates to a location of a person potentially affected by the weather event.

9. The method of claim 1 wherein the event occurrence relates to a select time or period of time.

10. The method of claim 1 wherein the event occurrence is the arrival to or departure from a given location, area, or proximity of an area.

11. The method of claim 1 wherein the information is sent to a front end device capable of delivering the information to the select communication device within the purality of communication devices, which is at least one of the group consisting of a pager, computer, telephone, mobile terminal, facsimile machine, and personal digital assistant.

12. The method of claim 1 wherein the information is sent to a front end device capable of delivering the information to a select communication device within the plurality of communication devices, which is configured to effect delivery of the information in the form of at least one of the group consisting of a page, email, short message service message, facsimile, audio message, and packet message.

13. The method of claim 1 further comprising creating the user-desired profile based on user input to define the event occurrence and the location indicia.

14. The method of claim 13 wherein the user-desired profile defines the plurality of communication devices to which to send the information.

15. The method of claim 14 wherein the user-desired profile defines where to access content to provide as the information.

16. The method of claim 1 wherein the event occurrence is identified by receiving a message sent from at least one of the group consisting of a service provider, a user's communication device, an internal process, and an external process.

17. A system for notification comprising a communication interface associated with a control system adapted to:
   a) determine an event occurrence;
   b) determine location indicia; and
   c) send information to a plurality of communication devices when the event occurrence and the location indicia correlate with an event criteria and location criteria defined in a user-desired profile.

18. The system of claim 17 wherein to determine the event occurrence, the control system is further adapted to:
   a) wait for an event trigger signaling the event occurrence;
   b) identify the user-desired profile defining the event criteria corresponding to the event occurrence; and
   c) trigger the determining the location indicia step upon identifying the user-desired profile wherein the event occurrence corresponds with the event criteria.

19. The system of claim 17 wherein to determine the location indicia, the control system is further adapted to:
   a) wait for a location trigger with the location indicia;
   b) identify the user-desired profile defining the location criteria corresponding to the location indicia; and
   c) trigger the determining the event occurrence step upon identifying the user-desired profile wherein the location indicia corresponds with the location criteria.

20. A computer readable medium comprising software configured to instruct a computer to:
   a) determine an event occurrence;
   b) determine location indicia; and
   c) send information to a plurality of communication devices when the event occurrence and the location indicia correlate with an event criteria and location criteria defined in a user-desired profile.

21. The computer readable medium of claim 20 wherein to determine the event occurrence, the software includes instructions to:
   a) wait for an event trigger signaling the event occurrence;
   b) identify the user-desired profile defining the event criteria corresponding to the event occurrence; and
   c) trigger determination of the location indicia upon identifying the user-desired profile wherein the event occurrence corresponds with the event criteria.

22. The computer readable medium of claim 20 wherein to determine the location indicia, the software includes instructions to:
   a) wait for a location trigger with the location indicia;
   b) identify the user-desired profile defining the location criteria corresponding to the location indicia; and
   c) trigger determination of the event occurrence upon identifying the user-desired profile wherein the location indicia corresponds with the location criteria.

23. A system for notification comprising:
   a) means for determining an event occurrence;
   b) means for determining location indicia; and
   c) means for sending information to a plurality of communication devices when the event occurrence and the location indicia correlate with an event criteria and location criteria defined in a user-desired profile.

* * * * *